March 24, 1942.       G. R. DALAGER       2,277,634
SQUARE ROOT SCALE
Filed Aug. 18, 1939
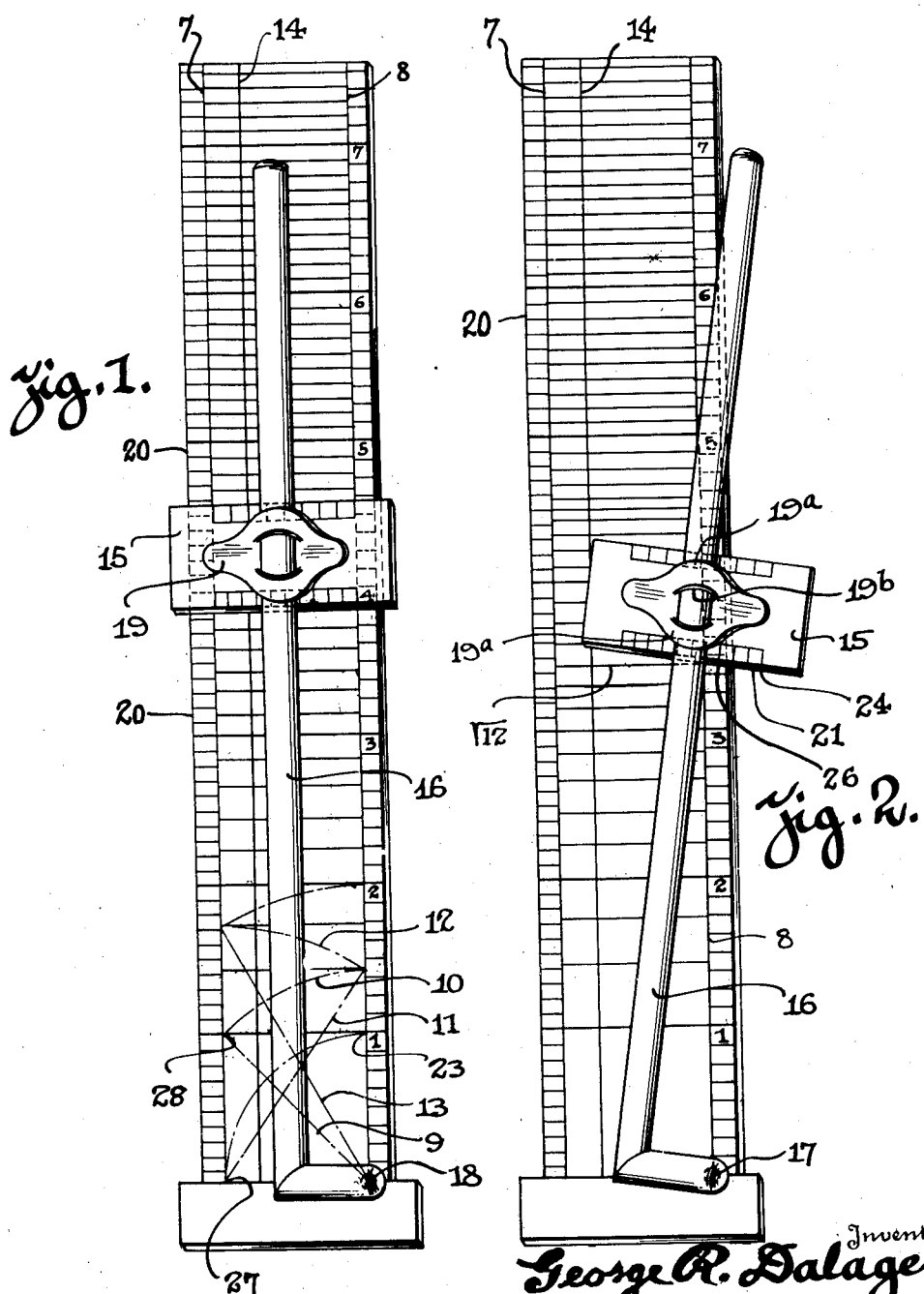
George R. Dalager, Inventor
By Lester L. Sargent, Attorney Patented Mar. 24, 1942

2,277,634

UNITED STATES PATENT OFFICE 2,277,634

SQUARE ROOT SCALE

George Rosenius Dalager, Glenwood, Minn.

Application August 18, 1939, Serial No. 290,850

4 Claims. (Cl. 33—75)

My invention is a mathematical scale that enables a person to deal with the square root of numbers as readily as one deals with the common numbers by use of the foot-rule or meter measure.

I attain this object of my invention by the mechanism illustrated in the accompanying drawing, in which—

Figure 1 is a front plan view of my invention with rod 16 pivotally mounted on the ruler bearing the scale markings, a portion of the rod and ruler being broken away;

Fig. 2 is a similar view but with the rod and vernier scale adjusted to a position for solving a particular problem.

Referring to Figure 1 of the drawing, I provide a ruler having parallel lines 7 and 8 spaced one unit apart, the unit being either an inch, a centimeter, or some other predetermined measure of distance depending on what unit the scale is made for. The graduations on the scale are made as follows: First, with a compass pivoted at point 18, Figure 1, and spread to 27 at foot of opposite parallel line where an arc is drawn which cuts line 8 at point 23. This point locates the line which represents the square root of one. Second, the compass is spread between 18 and 28. With dotted line 9 as radius, arc 10 is made and thereby is located the position of the line which measures the square root of two upon line 8. Third, the compass is now pivoted at 27 and the distance indicated by dotted line 11 is used as a radius to construct arc 12 which locates the position of the line which measures the square root of three upon line 8, and so on for the square roots of four, five, and the other numbers regardless of the length of the scale. The number of lines that thus form between each two consecutive rational square roots are always twice the lower such root. Between 7 and 8 are 14, for instance, between 11 and 12 are 22 irrational square roots etc.

The instrument consists of three scales, of which scales, two are essential. The central one which can be called the square root scale is crossed by parallel lines drawn at distances from zero on the scale that are equal to the square roots of the numbers from 1 to 100, if the scale is ten inches long and from 0 to 144 if the scale is twelve inches long. And the lines are located as shown in Fig. 1. The outer scale is the ordinary ten or twelve inch ruler. This scale is built upon the lines that are the square roots of these numbers that are perfect; i. e., 1, 4, 9, 16, 25, 36, 49, 64, 81, 100, 121, and 144 and are, of course, numbers 1, 2, 3, 4, 5, 6, 7, 8, 9, 10, 11 and 12 for a twelve inch ruler. Each inch division in this scale is simply divided into tenths. The third scale to the right may be ignored as merely a repetition of the last-mentioned scale with this difference only: that it is divided into eighths instead of tenths.

For the inch unit a twelve inch scale is suggested.

The rational square roots, 1, 2, 3, 4 and so on are used on my scale as division points and serve as the common scale of the numbers.

For dealing with the square roots of whole numbers and for fractions that portion only, of the scale lying between lines 14 and 20 is necessary.

For measuring lengths equal to the square roots of mixed numbers as 23.75, etc., member 15 is necessary.

Figure 2 represents a semi-circular rod 16, as shown. This pivots at point 17 upon point 18 (see Fig. 1). It is a carrier guide rod for runner number 15.

Runner 15 has two small scales one unit long each and are divided, one into tenths; the other into eighths so that readings can be made in hundredths or sixty-fourths. Runner 15 is secured to the ends of the handle member 19, and has a brake effect on the carrier rod 16. Carrier rod 16 swings on a pivot 18. Runner 15 is moved up or down rod 16 by pressing on the wings 19a of the handle 19 which is made of flexible material so that it gives and releases the pressure upon the rod when the operator's fingers gently press on the wings 19a of the handle.

The carrier rod and runner serve as follows: An imaginary straight line between points 17 and 24 is parallel with the carrier rod. When the carrier rod swings on pivot 18 to bring the edge 21 of the runner in position to coincide with the line $\sqrt{12}$, for instance, the distance from point 24 on runner 15 to point 18 on the scale is the length of the square root of twelve units. Now, if division line 26 is made to intersect with a line 8 on scale, by swinging carrier guide with runner 15, three tenths to the right, the reading at point of intersection is the square of twelve and nine hundredths. (12.09.) If the fraction part of the mixed number is irrational, as .07, for example, the method is, first, to look up on the main scale, the square root of 7, namely, 2.63. Therefore, placing line 21 of runner upon line 8 of the scale so that they intersect at the point .263($=2.63 \div \sqrt{100}$) estimated, on line 21, the reading at the point will be the square root of 12.07.

A second method would be to swing carrier over to the left so that point 24 is placed on intersection of line $\sqrt{12}$ and line 14, which is point $\frac{1}{2}\sqrt{2}$ from line 8. This gives 12.5, in this instance for the imaginary hypothenuse, point 18 to point where line 14 and $\sqrt{12}$ intersect. So when point 24 swings back to line 8 the distance between points 24 and 18 is the square root of 12.5. This method can be used on any fraction, thus, $X^2 = \frac{1}{2}$, $X = \frac{1}{2}\sqrt{2}$.

The square roots of the numbers between zero and one are performed on that part of the scale that lies between zero and one. The square roots .1, .2, .3, .4, etc., appear directly as in the case of the rational roots of whole numbers.

To find irrational square roots of fractions we proceed as follows: For the square root of .03, for example, find 1.732 the square root of 3. $1.732 \div \sqrt{100}$ becomes .1732. Estimate this on fraction part of scale below the square root of one line. A vernier can be used here.

The purpose of my invention is to simplify the work of draftsmen, architects and engineers. My scale is a powerful tool for many purposes. I will cite but a couple of instances of its use. On a hypothenuse of ten units length one hundred right triangles can be constructed with my scale, as readily as the only one can be made with the common ruler. In fact, as many can be constructed upon any line as the number of which the line represents the square root, sixteen on a line $\sqrt{16}$ units long, for example. If the lengths of the two legs are $\sqrt{15}$ and $\sqrt{1}$, the hypothenuse is $\sqrt{16}$ or $\sqrt{15}+1$, if the legs are $\sqrt{14}$ and $\sqrt{2}$ the same is the case, and so on.

My scale gives directly the lengths of diagonals of rectangular figures, plane and solid. It gives equivalent areas, capacities, etc. Example: If capacity of pipes of the following dimensions, 1, 2, 3, 4, and 5 is compared to that of a large pipe it will be the sum of those dimensions squared. Hence $\sqrt{55}$ will be the diameter of large pipe, which is given directly by the scale.

The principle used in constructing the scale is the Pythagorean theorem.

What I claim is:

1. In a square root scale, the combination of a ruler having graduations or lines disposed at different distances from a common origin, the distance of each line or graduation from the common origin representing the square root of a certain value, a rod pivotally mounted on one end of the ruler at the common origin, a second series of graduations extending along one longitudinal edge of the ruler and representing definite like sub-divisions throughout its length, a vernier scale adjustably and slidably mounted on said rod and disposed generally transversely of the ruler, said vernier scale having markings along one longitudinal edge portion sub-dividing it into like graduations to those of the aforesaid second series of graduations on the scale, whereby the rod and vernier scale may be swung laterally to bring the vernier scale to a predetermined point of conjunction with a desired portion of the ruler for making mathematical calculations quickly, substantially as and in the manner described in the foregoing specification.

2. In combination with the device defined in claim 1, said rod being half round in cross section and having its flat face contiguous to the face of the ruler.

3. In combination with the device defined in claim 1, the aforesaid vernier scale having a handle member, said handle member having openings for the passage of the rod therethrough, said handle member also being sufficiently flexible to permit of its being contracted or released manually to release it from or to restore frictional engagement with the rod on which it is slidably mounted, to permit of movement of the vernier scale to the desired portion of the ruler for making the particular calculation desired, substantially as hereinbefore described.

4. In a scale of the type described, the combination of a ruler having graduations or lines disposed at different distances from a common origin, the distance of each line or graduation from the common origin, representing the square root of a certain value, a rod pivotally mounted on one end of the ruler at the common origin, said rod being L-shaped at its pivoted portion, the ruler being graduated into fractions of an inch along one longitudinal edge portion, a vernier scale slidably mounted on the aforesaid rod and disposed generally transversely of the ruler, and having markings along an edge portion dividing it into fractions of an inch corresponding with the last mentioned markings on the ruler, whereby the rod and vernier scale may be swung laterally to bring the vernier scale to a predetermined point of conjunction with a desired portion of the ruler for making mathematical calculations quickly, substantially as described and shown.

GEORGE ROSENIUS DALAGER.